R. LAMB.
SWAGING DEVICE FOR DENTAL AND OTHER PURPOSES.
APPLICATION FILED FEB. 4, 1911.
1,044,892.
Patented Nov. 19, 1912.
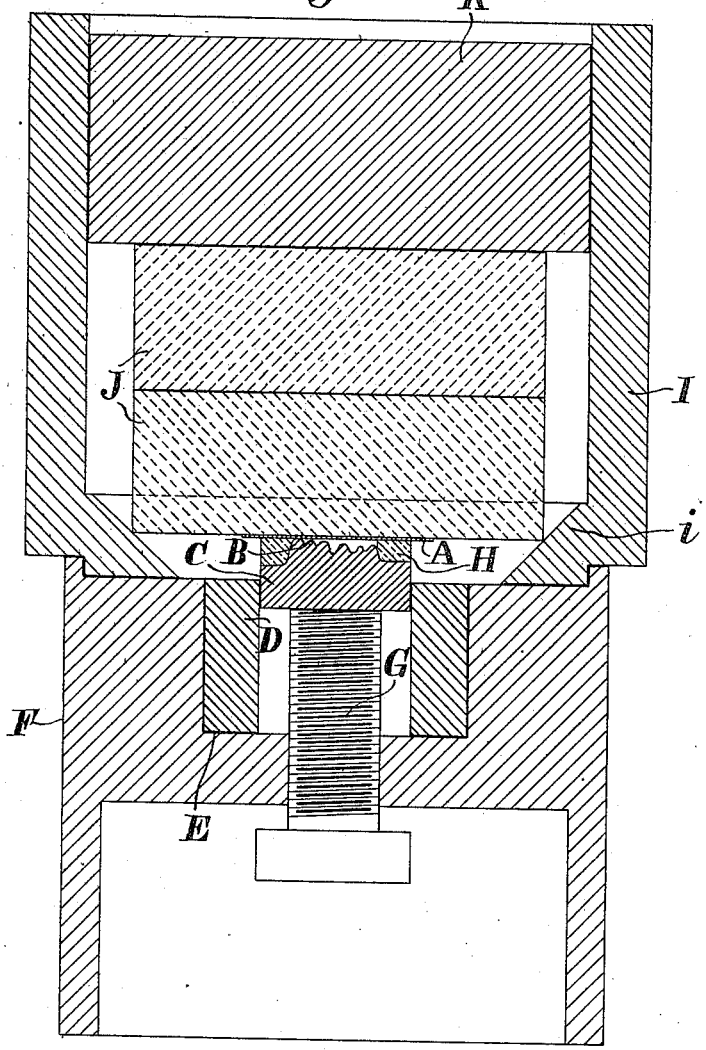
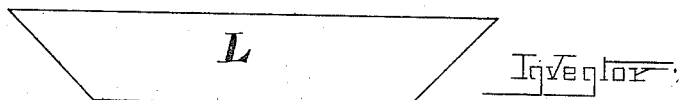
Fig. 2.

UNITED STATES PATENT OFFICE.

RALPH LAMB, OF LIVERPOOL, ENGLAND.

SWAGING DEVICE FOR DENTAL AND OTHER PURPOSES.

1,044,892. Specification of Letters Patent. Patented Nov. 19, 1912.

Application filed February 4, 1911. Serial No. 606,587.

*To all whom it may concern:*

Be it known that I, RALPH LAMB, a subject of the King of Great Britain, residing at Liverpool, in the county of Lancaster, in the Kingdom of England, have invented certain new and useful Improvements in or Relating to Swaging Devices for Dental and other Purposes, of which the following is a specification.

This invention relates to swaging devices for imparting a given shape to an object against which it is forcibly impressed.

It has been designed especially for swaging or drawing gold and other metal blanks into caps to form tooth crowns, or plates, or caps for use in connection with dental bridge work, also for swaging blanks into shape for vulcanite plates, but can be used for other purposes.

By this invention the swaging or drawing of objects into shape is effected by a single mold or die by providing around the die a firmly supported layer of plaster of Paris or other suitable hard non-resilient material, to form a temporary bed below the top of the mold, against which bed and the mold the object is forcibly impressed in order to impart the first step in swaging it. This layer of material is however reducible or disintegratable, so that by removing a little to expose more of the mold, and applying a pressure to the object after each reduction of the layer, a further swaging of the object is effected, until finally the object is swaged to the shape of the mold.

The invention will be understood from the following description, reference being had to the accompanying drawing, in which—

Figure 1 is a vertical section of my swaging device as applied to dental swages for making artificial crowns for teeth, and Fig. 2, the plate for closing the center hole of the cylinder.

I provide a suitable impressing device such as a screw press for the purpose of swaging thin plates of gold, etc., such as A, on a dental mold or die such as B, said mold B being a cast of the tooth to be crowned. This mold or die B is supported on a metallic base piece C, which is mounted within a collar D inserted in a cavity E in a bed F. This bed F has a set screw G in it, whose shank is screwed through a threaded hole therein, and projects up through the collar D in which the mold or die is supported and against the base piece C so as to form a support therefor. By turning the head of the set screw G from below, the height of the mold B can be adjusted.

The cap or crown is produced by a sequence or succession of operations in the following manner, so as to gradually reduce or swage it to the required form. The surface of the base piece C in which the mold is fixed, is coated with a layer H of plaster of Paris to form a bed for the blank A to be swaged, but permit of the face of the mold B projecting above it to such a distance as will impart the first step in swaging the blank. The blank is now forcibly impressed against the mold A so as to swage it, but the plaster of Paris forms a temporary base of the mold, so that only the first step in swaging is performed. Then a little of the plaster of Paris is scraped off or disintegrated from its face, to expose a little more of the mold, and the set screw turned to raise the base in which the mold is fixed. Another pressure is given to the blank, so as to perform the second step in swaging, and so the operation is repeated again and again. Thus by means of one mold, a series of impressions are produced and the cap swaged step by step into the required shape by removing a little of the plaster of Paris and lifting the mold by the set screw, between each successive impression, until the cap is reduced or swaged to the required shape. If it is desired to use a larger or smaller mold, then a collar D with a larger or smaller bore but the same size exteriorly is inserted in the bed, and a larger or smaller base with two or more molds supported thereby inserted. The operation of drawing or swaging by successive operations is substantially the same as before described.

For the purpose of applying the necessary pressure, a cylinder I is provided which fits at bottom on the top of the bed F by rabbet and flange. This cylinder is closed at one end except for a center hole, the flange around it forming a seat *i*. Into this cylinder is placed one or more rubber blocks J, and at the top of them a metal block K. A mold B or cast of the tooth to be crowned is prepared in metal, and with its base piece C is placed in the collar D. The blank A is laid on the mold B and plaster of Paris H, and the cylinder (with its contents resting on the flange *i*), is placed on the top of the bed F. The plunger of the press is brought down as by a screw, and pressure being applied to the blocks J, causes the center of the lower block to impart an elastic and equable pressure to the blank against the mold, and so swages the blank upon it, and at the same time binds the cylinder I against the bed F. After pressure has been applied, and the first step in swaging completed, the plunger is raised, the cylinder I with its blocks J K removed, the partly swaged blank A taken off and annealed, and trimmed, and a little plaster of Paris scraped off the top of the layer H. The screw G is turned so as to raise the mold just so much in proportion as the layer H has been reduced, the partly swaged blank is replaced and the cylinder with its contents replaced also on the bed. The swaged part of the blank and the top of the mold now slightly penetrate the center of the elastic block owing to the mold having been raised. The operation of swaging is now repeated and so on by a succession of operations until the required depth of crown is obtained and a cap produced of the required shape and size. The center hole at the end of the cylinder I, can be closed by a disk L resting on the abutments $i$, and when so closed the cylinder is suitable for use for another purpose, such as the ordinary method of shot swaging, $i.\ e.$, the swaging of dental blanks on the metal cast B of the tooth, by pressure applied to shot within the cylinder I.

As applied to swaging blanks for other purposes, the invention will be understood without the necessity of any further description.

No claim is herein made to the process above set forth, as that is reserved for a divisional application, the matter having been removed from the present case in view of the requirement of the Patent Office.

I declare that what I claim is:—

1. In a swaging device for dental and other purposes, the combination of a swaging die; a body of material susceptible of being reduced in height for successive swaging actions surrounding the same and initially rising to a height approximately equal to that of the die, and upon which, and the die, the material to be swaged is placed; and means for forcing the material to be swaged into contact with the die and the surrounding body.

2. In a swaging device for dental and other purposes, the combination of a swaging die; a body of mechanically reducible material surrounding the same, and initially rising to a height approximately equal to that of the die and upon which, and the die, the material to be swaged is placed; and means for forcing the material to be swaged into contact with the die and the surrounding body.

3. In a swaging device for dental and other purposes, the combination of a swaging die; a body of plaster-of-Paris surrounding the same, and initially rising to a height approximately equal to that of the die and upon which, and the die, the material to be swaged is placed; and means for forcing the material to be swaged into contact with the die and the surrounding body.

4. In a swaging device, the combination of a die; a supporting and limiting member for the material to be swaged surrounding the die, said member being formed of material capable of being reduced in height for various successive swaging steps; and a pressure device formed of yielding material adapted to force the material to be swaged into contact with the die and supporting body.

5. In a swaging device, the combination of a die; a supporting and limiting member for the material to be swaged surrounding the die, said member being formed of a substance capable of being reduced in height for various successive swaging steps; a pressure device formed of yielding material adapted to force the material to be swaged into contact with the die and supporting body; and means for crowding the body of the pressure device laterally, whereby the pressure will be localized upon the material being swaged.

6. In a swaging device, the combination of a die; a supporting and limiting member for the material to be swaged surrounding the die, said member being formed of a substance capable of being reduced in height for various successive swaging steps; a support for the die and member aforesaid; a chamber surrounding the die and member, said chamber being provided with an inwardly-inclined bottom wall or face; and a rubber block bearing upon said wall, and the material to be swaged resting on the die.

7. In a swaging device, the combination of a bed; a base piece mounted therein; a die mounted thereon; a supporting and limiting body for the material to be swaged, surrounding the die and formed of material capable of being mechanically reduced in height for various successive swaging steps; a chamber or cylindrical member having an inwardly inclined wall or flange; a rubber block mounted within said chamber, the lower edge of the block resting upon the inclined wall while the central portion of the lower face of the block bears upon the material to be swaged interposed between it and the die; and means for raising the base piece to compensate for the reduction in height of the supporting and limiting body aforesaid.

8. In a swaging device, the combination of the bed; an interchangeable collar mounted therein; a base plate carrying a mold or die mounted in the collar; a hollow open-ended body mounted on top of the bed and provided with an inclined shoulder at the lower end; an elastic block having its lower edge mounted on the shoulder; means for forcing the block against the blank that is placed on the mold; and a device for lifting the base plate and die toward the block.

In witness whereof, I have hereunto signed my name this 25th day of January 1911, in the presence of two subscribing witnesses.

RALPH LAMB.

Witnesses:
 G. C. DYMOND,
 RICHARD W. WILLIAMS.

Copies of this patent may be obtained for five cents each, by addressing the "Commissioner of Patents, Washington, D. C."